United States Patent [19]

Spulak

[11] 3,937,343
[45] Feb. 10, 1976

[54] ADJUSTABLE TIRE CART

[76] Inventor: Reynold Spulak, NW. on U.S. 81 - Box 948, Columbus, Nebr. 68601

[22] Filed: Nov. 9, 1973

[21] Appl. No.: 414,265

[52] U.S. Cl. .............................................. 214/332
[51] Int. Cl.² .......................................... B65G 7/00
[58] Field of Search .......... 214/330, 331, 332, 333, 214/334; 105/215 R

[56] References Cited
UNITED STATES PATENTS

| 1,374,986 | 4/1921 | Carter | 214/330 |
| 1,523,486 | 1/1925 | Manley | 214/331 |
| 2,252,534 | 8/1941 | Trotter | 214/332 |
| 2,329,613 | 9/1943 | Hokanson et al. | 214/330 |
| 2,392,830 | 1/1946 | Baum | 214/332 |
| 3,828,953 | 8/1974 | Reznicek | 214/332 |

FOREIGN PATENTS OR APPLICATIONS

| 1,154,659 | 4/1958 | France | 214/330 |

*Primary Examiner*—Robert J. Spar
*Assistant Examiner*—Lawrence J. Oresky
*Attorney, Agent, or Firm*—Hibben, Noyes & Bicknell

[57] ABSTRACT

A tire cart has been provided with an adjustable frame, adjustable tire lifting means, and adjustable tire support means so that one tire cart may be used to handle tires of different size and type.

7 Claims, 5 Drawing Figures

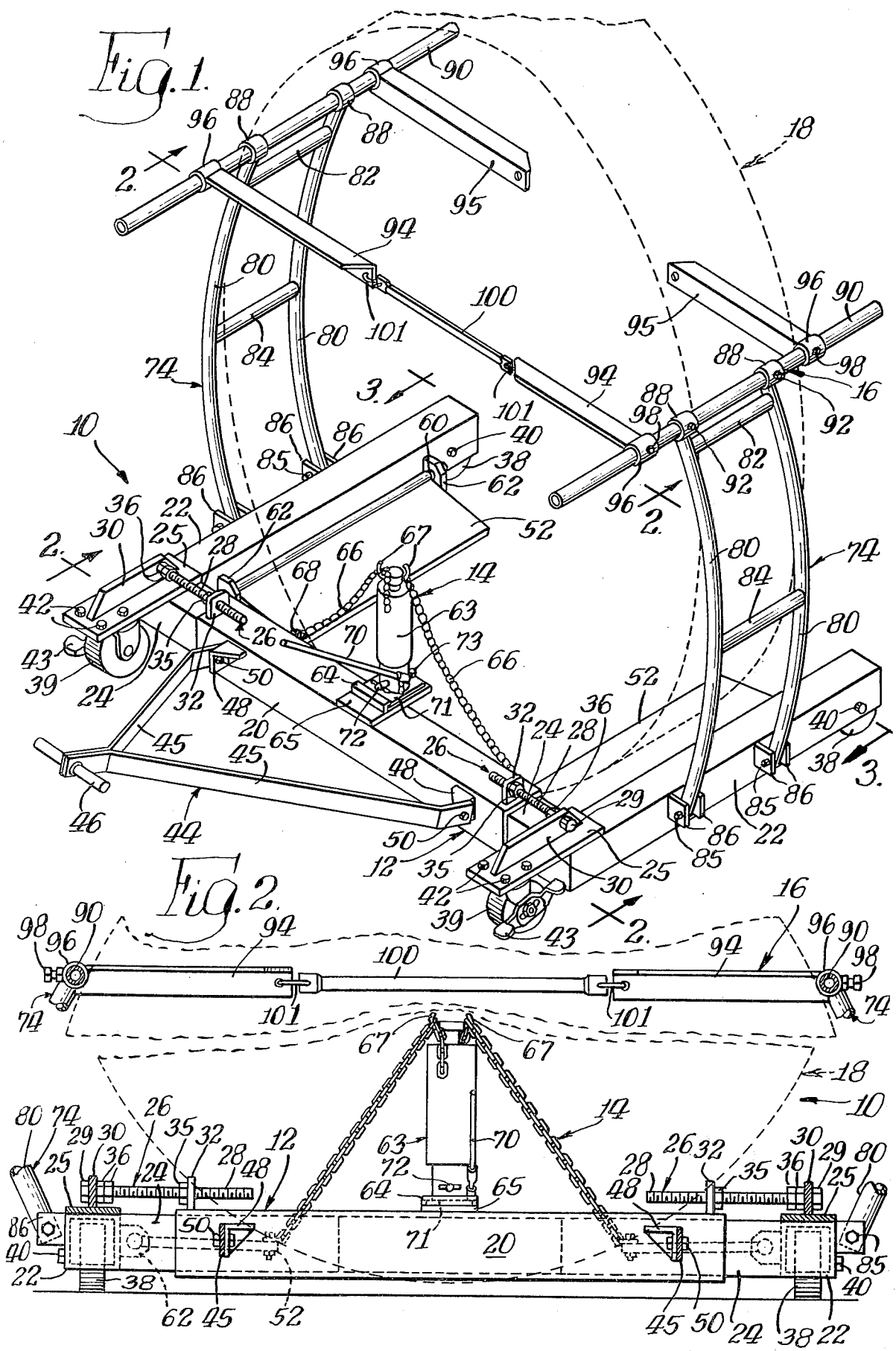

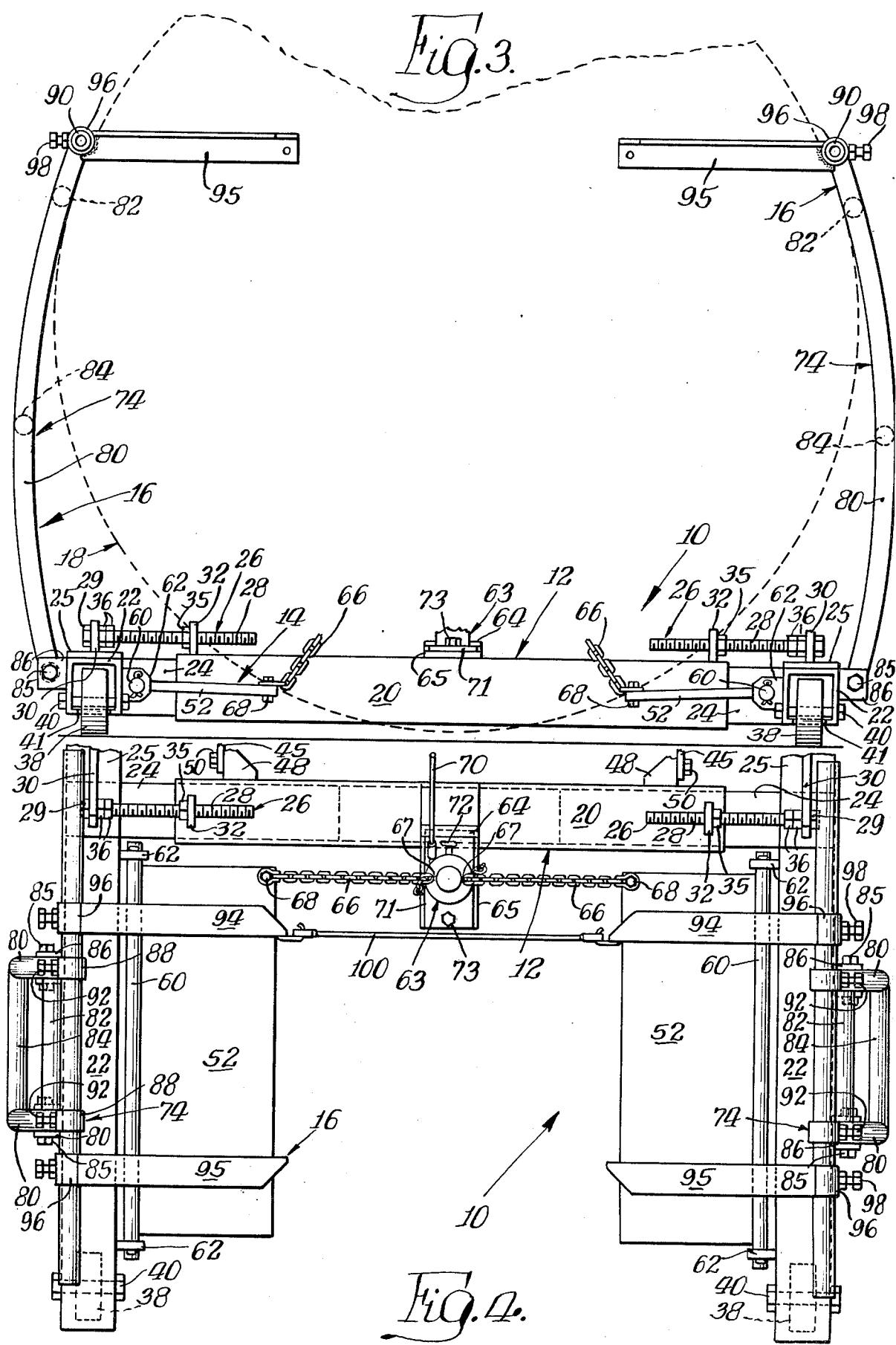

ADJUSTABLE TIRE CART

This invention relates to a tire cart, and more particularly to an adjustable tire cart for use with various size and type tires.

Tire carts are used by mechanics to provide assistance in handling tire and wheel assemblies or tires being removed from or installed on vehicles, such as farm tractors, highway trucks and off-highway equipment. Tires from such vehicles are large in size, having large diameters and/or large widths and weighing from several hundred to over 2,000 pounds. Such tires are difficult to maneuver around a garage or shop and are also difficult to maneuver into position for installation on the axles of such vehicles. The prior art tire carts were designed to handle only one particular type or size tire, be that the large diameter but moderate width farm tractor tire, or the medium diameter and large width dual tires of semi-tractors and trailers. A tire cart designed to handle one type of tire could not handle another type tire, and thus had limited utility. Sometimes, a shop or garage only had one tire cart for the type tire most frequently serviced by the shop, and the other type tires were handled without the convenience and safety provided by use of a tire cart. Other times, the shop or garage did not have any tire cart since the shop handled various type and size tires, but each in insufficient quantity to justify purchasing a tire cart.

Further, while some of the prior art tire carts did provide some sort of support, they did not hold the tire stable while being removed, installed or moved so that the tire could slip or fall off the cart, thus posing a danger to the mechanic. Usually, the prior art carts had tire supports which could not be positioned until the tire was removed from the vehicle, particularly, if the vehicle had a fender surrounding the tire.

The tire cart of the present invention has the advantage of being adjustable to accommodate various size and type tires. Further, the tire cart of the present invention has the advantage of stably holding the tire while being moved and during installation of a tire on or removal of a tire from even a vehicle having a fender so that the danger of a tire falling has been eliminated.

The tire cart of the present invention comprises a frame having a center section and two lateral sections, at least one of the lateral sections being adjustable to vary the size of the tire cart to accommodate various size or type tires. The tire cart is mounted on wheels and includes tire lifting means for raising and lowering the tire, the lifting means also being adjustable for various size and type tires. The cart further includes tire supporting means for supporting a tire so it does not fall, the tire supporting means also being adjustable.

The primary object of the present invention is to provide a novel and useful tire cart capable of handling various size and type tires, from large diameter farm tractor or off-highway equipment tires to wide dual tires used on highway semi-tractors and trailers.

Another object of the present invention is to provide a tire cart with adjustable tire lifting means which can accommodate different size and type tires.

Yet another object of the present invention is to provide a tire cart with adjustable tire supporting means for holding different size and type tires stable on the cart at all times.

These and other objects of the present invention will become apparent from the following description and the accompanying figures of drawings wherein:

FIG. 1 is a perspective view of a tire cart embodying the present invention, with one type and size tire being shown in dashed lines;

FIG. 2 is a cross-sectional view taken in the direction of 2—2 of FIG. 1, but showing the tire cart in a second position;

FIG. 3 is an elevational view taken in the direction of 3—3 of FIG. 1, but showing the tire cart in the second position;

FIG. 4 is a top view of the cart shown in FIG. 1, but the tire has been omitted for clarity.

Figure 5:
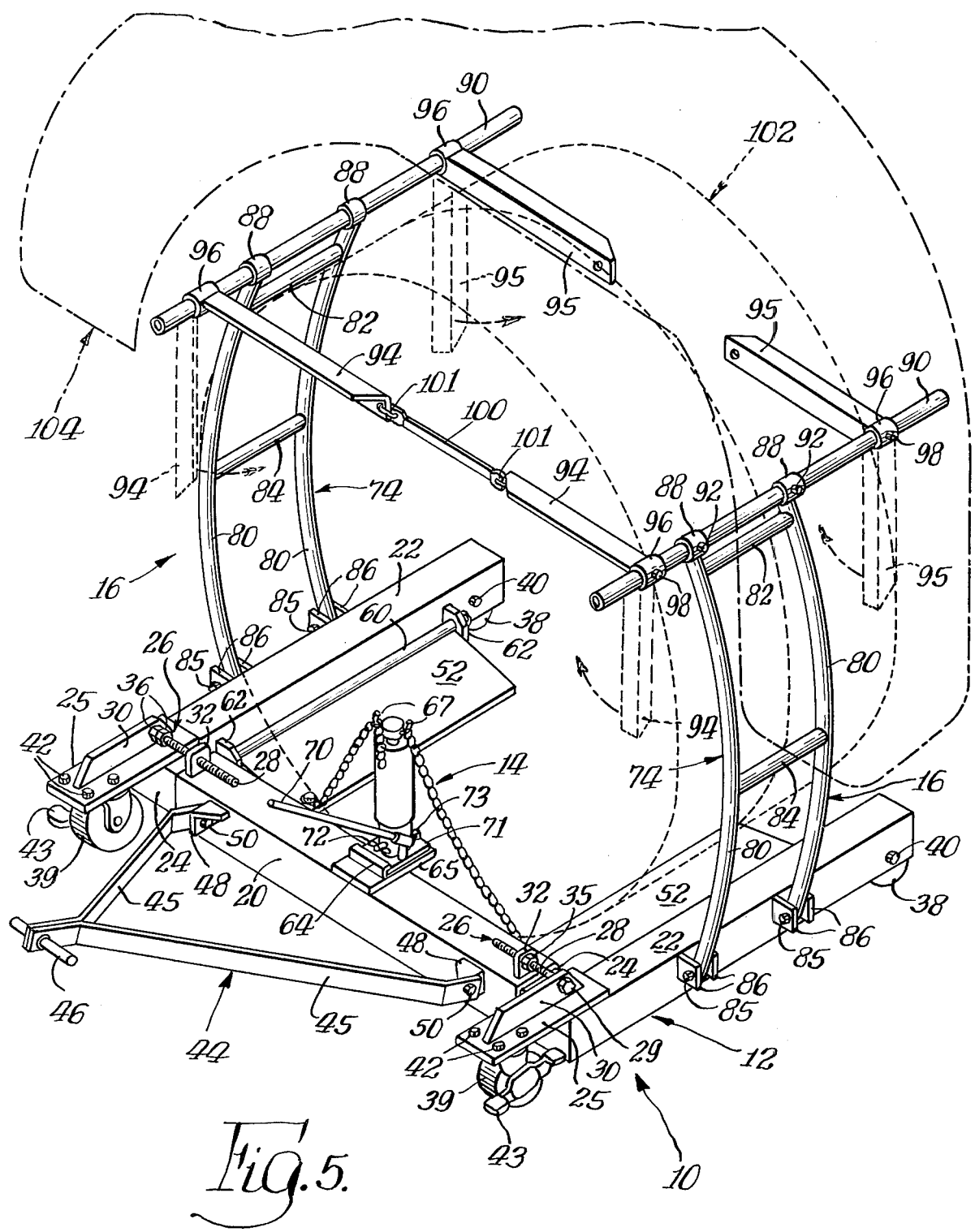
FIG. 5 is a view similar to FIG. 1, with the tire cart adjusted for a second type and size tire shown in dashed lines, and showing a vehicle fender in dash-dot lines.

Illustrated in FIGS. 1–5 is a tire cart 10 of the present invention. The tire cart 10 comprises an adjustable frame 12, adjustable tire lifting means 14 for raising and lowering a tire, and adjustable tire supporting means 16 for holding the tire stable on the cart. In FIGS. 1–3 the tire cart 10 is shown with a large diameter and moderate width farm tractor type tire 18 (dashed lines).

The frame 12 is adjustable and comprises a center section 20 and two lateral sections 22. While it is possible to provide a frame having only one adjustable lateral section, in this instance both lateral sections 22 are adjustable. The center section 20 is made preferably of a length of rectangular tubing, as are the two lateral sections 22. The lateral sections 22 are arranged perpendicularly to and extend away from the ends of the center section 20.

Each lateral section 22 includes a perpendicular extension 24 at its end near or adjacent the center section 20. The extensions 24 are preferably made of short lengths of the same tubing as the lateral sections 22 and are secured to the lateral sections. The adjacent ends of the lateral sections 22 and of the extensions 24 are welded together. These connections are reinforced by flat members 25 welded to the walls of the sections 22 and extensions 24. In this instance, the extensions 24 of the lateral sections 22 extend telescopically into the open ends of the center section 20 of the frame 12, but the reverse construction could also be used. The cross-sectional sizes of the center section 20 and extensions 24 of the lateral sections 22 are chosen to provide a sliding fit therebetween. This construction permits the width or spacing between the lateral sections 22 of the frame 12 to be varied.

Adjusting means 26 for moving and for holding each of the lateral sections 22 spaced from the center section 20 is provided, and in this instance comprises a threaded member or bolt 28 having a hexagonal head 29 and a pair of webs 30 and 32 mounted on the lateral section 22 and center section 20, respectively. The webs 30 are not directly mounted on the lateral sections 22, but instead each web 30 is mounted on the horizontal flat member 25 in a manner to stiffen it. The webs 30 extend vertically from the flat members 25 and have openings therein to rotatably receive the bolts 28. Each web 32 is welded directly to the center section 20 and extends vertically therefrom and parallel to the associated web 30. The webs 32 have openings therein to rotatably receive the bolts 28. A threaded nut 35 is welded to each of the webs 32 in alignment with the openings therein. In this instance a pair of threaded nuts 36, is securely locked on each of the bolts 28 adjacent the heads 29 to loosely trap the webs 30 between the nuts 36 and heads 29. Thus, the heads 29 of the bolts 28 may be conveniently rotated with, for example, a mechanic's ratchet wrench in one direction to draw the lateral sections 22 toward the center section 20 and in the opposite direction to force the lateral sections 22 away from the center section 20 to vary the spacing between the lateral sections.

To facilitate movement, the tire cart 10 is provided with four wheels 38 and 39. The wheels 38 and 39 are preferably arranged to be spaced generally equally about a tire loaded on the cart so that each wheel will carry approximately an equal share of weight of such tire. Therefore, the present tire cart 10 is much more easily moved about than prior tire carts which had one wheel, usually the wheel closest to the tire raising device, bearing most of the load. As shown in FIGS. 3 and 4, the wheels 38 are located at the ends of the lateral sections 22 farthest away from the center section 20. Each wheel 38 is rotatably carried on a bolt or axle 40 extending through openings in the opposite, vertical side walls of the lateral section 22. The lower walls of the lateral sections 22 are cut away, as indicated at 41 (FIG. 3), to accommodate the wheels 38. The wheels 39 are of the pivotable or caster type and are secured near the other ends of the lateral sections 22. The wheels 39 are secured to the outer, bottom surfaces of the flat members 25 by four bolts 42. To facilitate positioning and stopping the tire cart 10, the caster wheels 39 are equipped with brakes which are operated by the foot actuated levers 43.

A handle 44 is provided for maneuvering the tire cart 10 and is attached to the frame 12. The handle 44 comprises a pair of bent elongated members 45 and a short rod 46. The center section 20 of the frame 12 has a pair of small angle brackets 48 welded adjacent its ends, and the lower ends of the elongated members 45 are pivotably secured, as by fasteners 50, to the brackets 48. The short rod 46 extends transversely through openings in the upper ends of the elongated members 45 to provide a grip for the mechanic.

The tire lifting means 14 is provided on the tire cart 10 for raising and lowering a tire, and comprises a pair of flap members 52 pivotally mounted on the lateral sections 22, an actuating member mounted on the frame 12 for moving the flaps 52, and an adjustable linkage for connecting the actuating member to the pivotable flaps 52. Each of the flaps 52 has a rod 60 (FIG. 4) which is fixedly secured to the edge of the flap 52 adjacent the lateral section 22. As is best shown in FIGS. 3 and 4, a pair of spaced apart brackets 62 is secured, as by welding, to opposite ends of each of the inner side walls of the lateral sections 22. The brackets 62 have openings therein, and the openings receive the ends of the rods 60 so that the flaps 52 can pivot. The flaps 52 are caused to pivot by the actuating member which in this instance is a hydraulic jack device 63, The jack device 63 is mounted on a central extension 65 which in turn is secured, as by welding, to the walls of the center section 20. While the jack could be simply bolted to the extension, preferably, the jack is held by a bracket 64 welded to the extension 65 and a releasable fastener or bolt 73 on the extension 65. The bracket 64 forms a pocket to receive one end of a base 71 of the jack, and the bolt 73 holds the other end of the base 71. Thus, the jack 63 can be readily removed for use elsewhere.

While other forms of adjustable linkage may be provided, in this instance, it includes two lengths of chain 66. The hydraulic jack device 63 has on its upper end a pair of horns 67 for receiving or extending through the links of the chains 66. The lower ends of the chains 66 are secured to corners of the flaps 52 by bolts 68 (FIGS. 3 and 4). Thus, if the jack device 63 is raised by pumping the handle 70 or lowered by turning the valve 72, as is conventional, the upper portion of the jack device 63 having the horns 67 raises or lowers, and through the chains 66 causes the flaps 52 to pivot and raise or lower the tire 18.

The tire support means 16 comprises a pair of curved support arms 74 pivotally mounted on the lateral sections 22, and is adapted to engage and support a tire either carried on the cart or still on a vehicle. In this instance, each support arm 74 is made of two curved pieces of tubing 80 joined by fixed upper and lower cross members, 82 and 84, respectively. Each tube 80 of the arms 74 has a radius of curvature similar to that of the tires handled, the radius being a maximum of 60 inches, a minimum of 35 inches, and preferably about 40 inches. Each tube 80 is preferably an arcuate segment of about 50°. The lower end of each tube 80 is pivotably secured by a bolt 85 to a pair of small, vertical brackets 86 extending away from the outer side wall of the lateral section 22. The tubes 80 are arranged so that the upper ends of the support arms 74 curve toward each other. Each tube 80 has a tubular portion 88 secured thereto and receives a slidable horizontal bar 90. The horizontal bar 90 fits in the tubular portions 88 and is parallel to the lateral section 22. The bar 90 can be slid and then be locked in various positions relative to the tubes 80 by tightening setscrews 92 provided in the tubular portions 88. A pair of tire supports 94 and 95, in this instance made of angle, are adjustably mounted on each bar 90. The vertical sides of the tire supports 94 and 95 are arranged adjacent each other and can contact the sidewalls of the tire 18. The outer ends of the tire supports 94 and 95 are similar to the upper ends of the tubes 80, having tubular portions 96 to receive the bar 90. The tire supports 94 and 95, are held in position relative to the bar 90 by setscrews 98. The bar 90, itself, can engage the tread of the tire 18.

The operation of the tire cart 10 with a farm tractor type tire 18 is shown in FIGS. 1–3 and will now be discussed. Assume that a tractor (not shown) is properly jacked and blocked so that the tire 18 is elevated off the ground, and the tire cart is positioned adjacent the tire. If necessary, the lateral sections 22 of the frame 12 are adjusted by turning the bolts 28 in the appropriate direction so that the lateral sections 22 are spaced apart somewhat less than the diameter of the tire. If tire 18 is not covered by a fender, the support arms 74 can be laid down. The jack device 63 is lowered so that both flaps 52 are just above the ground. If necessary, the connecting lengths of chain 66 can be adjusted on the horns 67. The tire cart 10 then is pushed in toward the tire 18 and as close as possible to it so that the central extension 65 on which the jack device 63 is mounted nearly touches the tire. Now the support arms 74 may be raised until the bars 90 contact the tread of the tire (FIG. 1). The supports 94 and 95 are then positioned against the sidewalls of the tire and locked in place by tightening the setscrews 92 and 98. The opposite supports 94 and/or 95 may be connected together by a flexible elastic strap 100 to hold the support arms 74 in position, the supports and strap having openings to receive hooks 101. Now the wheel lug nuts (not shown) may be loosened from the wheel bolts (not shown) preparatory to removing the tire. After the wheel lug nuts are loosened, the jack device 63 is raised by pumping the handle 70, thus causing the flaps 52 to raise and engage the tire 18, as shown in FIG. 2. The weight of the tire is now on the cart and not bearing on the wheel bolts. With the weight of the tire 18 bearing on the tire cart 10 and the support means 16 stabilizing the tire, the cart may then be pulled away from the vehicle by the handle 44. The tire may be stored if the exposed parts of the tractor are to be serviced, or the tire can be taken to a service area if the tire itself is to be serviced.

The tire 18 can be easily unloaded from the cart. First, the tire is positioned against a wall or in a rack for support. The valve 72 of the jack device 63 is opened, thus causing the jack device 63 to lower and the flaps 52 to pivot downward toward the ground so that the tire now rests on the ground. The supports 94 and 95 can then be removed from around the tire, and the support arms 74 can be lowered. The cart may then be pulled away from the tire and used for other work.

Use of a cart in installing a tire is the reverse procedure of removing the tire. For example, the cart 10 can be positioned against a stored tire so that the lateral sections 22 are adjacent the tread of the tire. The support arms 74 and supports 94 and 95 are positioned on the tire similarly as shown in FIG. 1. The jack device 63 then may be raised to pivot the flaps 52 upwardly against the tire and to raise the tire off the ground (FIG. 2). The tire then may be moved into position for installation on the vehicle. For installation, the tire is generally raised to a height so that the wheel bolt openings (not shown) align with the wheel bolts (not shown) on the vehicle axle. The cart is then moved toward the axle so that the openings in the wheel fit on the wheel bolts. The wheel lug nuts are then installed, and the cart is taken away.

Should it be desired to use the tire cart for another type tire, such as the dual tires 102 (dashed lines) shown in FIG. 5 and used on highway semi-tractors and trailers, it is necessary to first adjust the cart for that type tire. The cart frame 12 is adjusted by rotating the bolts 28 so as to narrow the spacing between the lateral sections 22. Also, if necessary the chains 66 can be adjusted to accommodate the shorter distances between the flaps 52 and the jack device 63.

Also, the supporting means 16 may need adjustment. As shown in FIG. 5 the bars 90 may be slid inwardly toward the vehicle to permit the supports 95 to fit around the inner surface of the wider dual tires 102. Since the support arms 74 are curved, it is possible to position them against the tire of even a vehicle with a fender, indicated at 104 and shown in dash-dot lines. The support arms 74 can fit in the space between the fender 104 and the tire 102. Thus, it is possible to support the tire at all times, even during installation and removal. Where clearance between the tire 102 and fender 104 is particularly close, the supports 94 and 95 are first locked in position on the bar 90 by tightening the setscrews 98 so that they hang down vertically as shown in dashed lines. The cart 10 may then be pushed into position around the tire. The arms 94 are then rotated so that the supports 94 and 95 are as shown in FIG. 5. Now the setscrews 92 are tightened to hold the supports 94 and 95 in position.

Installation and removal of the tire 102 is similar to the procedure previously described.

While only one embodiment of the invention has been illustrated and described, it is understood that modifications, variations and equivalent structures fall within the scope of the appended claims.

I claim:

1. An adjustable tire cart for handling various size and type tires, comprising a frame having a center section and two lateral sections, said lateral sections being spaced apart and extending perpendicularly from the ends of said center section, each of said lateral sections having a perpendicular extension at one end thereof, said perpendicular extensions telescopically engaging said center section to permit adjustment of the spacing between said lateral sections for accommodating various tires, tire lifting means on said frame for engaging and raising or lowering a tire, said tire lifting means including an actuating member mounted on said frame, a pair of pivotable flap members mounted on said lateral sections, and adjustable length linkage connecting said actuating member to said flap members, said adjustable linkage including two lengths of chain, each of said lengths of chain having a first connection connected to one of said flap members and a second connection connected to said acutating member, and at least one of said first and second connections including means for engaging a selected link of the length of chain extending between said connections.

2. A tire cart as in claim 1, wherein said actuating member comprises a jack device mounted on said center section, and said link engaging means comprises a pair of horns carried by said jack device and respectively engageable with a selected link of each of said lengths of chain.

3. An adjustable tire cart for handling various size and type tires, comprising a frame having a center section and two lateral sections, said lateral sections being spaced apart and extending perpendicularly from the ends of said center section, said lateral sections having perpendicular extensions secured thereto, said extensions telescoping within said center section, said lateral sections being adjustable relative to said center section to vary the spacing between said lateral sections for accommodating various tires; means for moving and holding said lateral sections in various positions relative to said center section; tire lifting means on said frame for engaging and raising or lowering a tire, said tire lifting means including an actuating member mounted on said frame, a pair of pivotable flap members, one flap member being mounted on each of said lateral sections, adjustable length linkage connecting said actuating member to said flap members; tire support means including a pair of support arms, each of said support arms being pivotally mounted at its lower end to a respective one of said lateral sections, said support arms curving inwardly toward each other, each of said support arms having an adjustable bar at its upper end, said bars being parallel to said lateral sections and being adapted to engage the tread of a tire, and a pair of supports adjustably mounted on each of said bars, said supports extending perpendicularly from said bars and being adapted to engage the sidewalls of a tire; and a wheel mounted near each of the respective ends of said lateral sections so that the weight of a tire is generally equally distributed on all four of said wheels.

4. A tire cart as in claim 3, wherein said actuating member comprises a hydraulic jack device mounted on said center section, said jack device having a pair of horns secured thereto, and said adjustable linkage comprises two lengths of chain, one link of each of said lengths of chain being connected to its associated flap member and another of the links of each of said lengths of chain being engageable with a respective one of said horns on said jack device so that the angular positions of said flap members can be adjusted before said cart is engaged with a tire and said hydraulic jack device is actuated.

5. A tire cart as in claim 3, wherein said actuating member comprises a hydraulic jack releasably mounted on said frame.

6. A tire cart as in claim 5, wherein said jack has a base, and said frame has a bracket forming a pocket to receive said base and a releasable fastener to engage said base for removably securing said base to said frame.

7. An adjustable tire cart for handling various size and type tires, comprising a frame having a center section and two lateral sections, said lateral sections being spaced apart and extending perpendicularly from said center section, a support arm pivotally mounted at its lower end on each of said lateral sections, said support arms curving inwardly toward each other and having radii of curvature similar to that of tires to be handled by said cart, an adjustable bar on the upper end of each support arm, said bars being parallel to said lateral sections and being adapted to engage the tread of the tire, a pair of supports adjustably mounted on each bar, said supports extending perpendicularly from said bars and being adapted to engage the sidewalls of the tire, and at least one elastic strap detachably connected to one of said pairs of supports and holding said bars against the tread of the tire, and tire lifting means on said frame for engaging and raising or lowering a tire.

* * * * *